United States Patent Office 3,766,243
Patented Oct. 16, 1973

3,766,243
UREIDOPHENYLISOTHIOUREAS
Arno Widdig, Blecher, Engelbert Kuhle, Bergedorf-Gladbach, Hans Scheinpflug, Leverkusen, Ferdinand Grewe, Burscheid, and Helmut Kaspers and Paul Ernst Frohberger, Leverkusen, Germany, assignors to Bayer Aktiengesellschaft, Leverkusen, Germany
No Drawing. Filed May 10, 1971, Ser. No. 141,977
Claims priority, application Germany, May 25, 1970,
P 20 25 413.1
Int. Cl. C07c 157/14
U.S. Cl. 260—470                                    4 Claims

ABSTRACT OF THE DISCLOSURE

Ureidophenylisothioureas of the formula

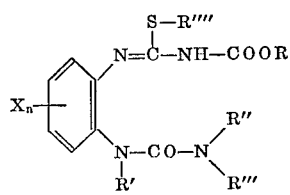

in which $n$ is 0, 1 or 2,
X is halogen, lower alkyl or alkoxy,
R is lower alkyl,
R' and R" are each hydrogen or lower alkyl,
R''' is hydrogen; alkyl with 1 to 18 carbon atoms optionally substituted by halogen, nitrile, lower alkoxy or lower alkoxycarbonyl; cycloalkyl with 5 to 8 carbon atoms; aralkyl optionally substituted in the aryl moiety by halogen, lower alkyl or alkoxy; phenyl optionally substituted by halogen, lower alkyl or alkoxy; acyl with up to 18 carbon atoms optionally substituted by halogen or lower alkoxy; aroyl optionally substituted by halogen, lower alkyl or alkoxy; alkylsulfonyl; arylsulfonyl optionally substituted by halogen, amino, lower alkyl or alkoxy; or di-lower alkylamino; or
R" and R''', together with the bonding nitrogen atom, form a heterocyclic ring with 4 to 7 carbon atoms, which ring optionally contains oxygen or sulfur as further hetero-atoms, and
R'''' is alkyl with 1 to 12 carbon atoms, cycloalkyl with 3 to 8 carbon atoms, alkenyl with up to 12 carbon atoms or aralkyl optionally substituted in the aryl moiety by halogen, lower alkyl or alkoxy, which possess fungicidal, insecticidal, acaricidal, anti-bacterial and growth-regulating properties.

The present invention relates to and has for its objects the provision of particular new ureidophenylisothioureas, i.e. N-2-(3'-optionally alkyl substituted-ureido)-phenyl-N' - alkoxycarbonyl-S-alkyl-isothioureas, which possess fungicidal, insecticidal, acaricidal, anti-bacterial and growth-regulating properties, active compositions in the form of mixtures of such compounds with solid and liquid dispersible carrier vehicles, and methods for producing such compounds and for using such compounds in a new way especially for combating fungi, insects, acarids, and bacteria and for regulating the growth of vegetation, with other and further objects becoming apparent from a study of the within specification and accompanying examples.

It is known from U.S. Pat. 2,457,674 that dithiocarbamates, for example zinc ethylene-1,2-bis-dithiocarbamate (Compound A), can be used as fungicides. The action of these compounds is not always satisfactory, however, especially if small amounts are used.

The present invention provides ureidophenylisothioureas of the general formula:

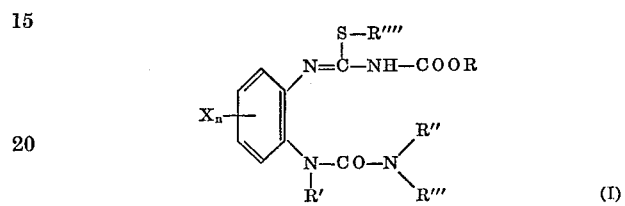

in which $n$ is 0, 1 or 2,
X is halogen, lower alkyl or alkoxy,
R is lower alkyl,
R' and R" are each hydrogen or lower alkyl,
R''' is hydrogen; alkyl with 1 to 18 carbon atoms optionally substituted by halogen, nitrile, lower alkoxy or lower alkoxycarbonyl; cycloalkyl with 5 to 8 carbon atoms; aralkyl optionally substituted in the aryl moiety by halogen, lower alkyl or alkoxy; phenyl optionally substituted by halogen, lower alkyl or alkoxy; acyl with up to 18 carbon atoms optionally substituted by halogen or lower alkoxy; aroyl substituted by halogen, lower alkyl or alkoxy; alkylsulfonyl; arylsulfonyl optionally substituted by halogen, amino, lower alkyl or alkoxy; or di-lower-alkylamino; or
R" and R''', together with the bonding nitrogen atom, form a heterocyclic ring with 4 to 7 carbon atoms, which ring optionally contains oxygen or sulfur as further hetero-atoms, and
R'''' is alkyl with 1 to 12 carbon atoms, cycloalkyl with 3 to 8 carbon atoms, alkenyl with up to 12 carbon atoms or aralkyl optionally substituted in the aryl moiety by halogen, lower alkyl or alkoxy.

It has surprisingly been found that these compounds display strong fungicidal properties.

The invention also provides a process for the production of an ureidophenylisothiourea of the Formula I in which an ureidophenylthiourea of the general formula:

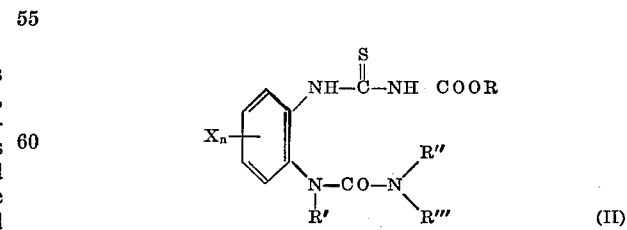

in which

X, n, R, R', R" and R''' have the abovementioned meanings, is reacted with an alkylating agent of the general formula:

$$R''''—Y \quad (III)$$

in which

R'''' has the abovementioned meaning, and
Y is halogen, arylsulfonate or alkylsulfate, in the presence of base and of a diluent.

Surprisingly, the unreidophenylisothioureas according to the invention show a higher fungicidal activity than the generally known commercially available product zinc ethylene-1,2-bis-dithiocarbamate (A). The active compounds according to the invention hence represent an enrichment of the art.

If N-2-(3'-methylureido)-phenyl-N'-ethoxycarbonyl-thiourea, methyl iodide and sodium hydroxide are used as the starting substances, the course of the reaction can be represented by the following equation:

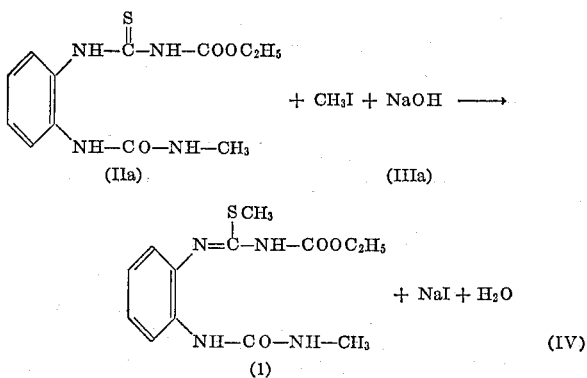

In the foregoing formulae preferably X is chlorine, bromine, fluorine, lower alkyl such as methyl, ethyl, isopropyl or n-butyl, or lower alkoxy such as methoxy, ethoxy or isopropoxy; n is 0 or 1; R is alkyl of 1 to 4 carbon atoms and especially methyl or ethyl; R' and R" are each hydrogen or alkyl of 1 to 4 carbon atoms, especially methyl or ethyl; R''' is hydrogen, alkyl with up to 12 carbon atoms, benzyl, phenyl, p-tolyl, p-methoxyphenyl, methoxyethyl, ethoxypropyl, cyanopentyl, acetyl, benzoyl, methanesulfonyl, p-toluenesulfonyl or dimethylamino; or R" and R''' together form a tetramethylene or pentamethylene group; and R'''' is preferably alkyl of 1 to 4 carbon atoms, cyclohexyl, benzyl or allyl.

As examples thereof there may be mentioned:

N-2-ureidophenyl-N'-methoxycarbonyl-thiourea,
N-2-(3'-methylureido)-phenyl-N'-ethoxycarbonyl-thiourea,
N-2-(3',3'-dimethylureido)-phenyl-N'-ethoxycarbonyl-thiourea,
N-2-(3'-butylureido)-phenyl-N'-ethoxycarbonyl-thiourea,
N-2-(3'-octylureido)-phenyl-N'-isopropoxycarbonyl-thiourea,
N-2-(3'-dodecylureido)-phenyl-N'-methoxycarbonyl-thiourea,
N-2-(3'-ω-cyanopentylureido)-phenyl-N'-ethoxycarbonyl-thiourea,
N-2-[3'-(2-methoxyethyl)-ureido]-phenyl-N'-ethoxycarbonyl-thiourea,
N-2-(3'-benzylureido)-phenyl-N'-ethoxycarbonyl-thiourea,
N-2-(3'-phenylureido)-phenyl-N'-ethoxycarbonyl-thiourea,
N-2-(3',3'-tetramethyleneureido)-phenyl-N'-methoxycarbonyl-thiourea,
N-2-(3'-acetylureido)-phenyl-N'-ethoxycarbonyl-thiourea,
N-2-(3'-benzoylureido)-phenyl-N'-methoxycarbonyl-thiourea,
N-2-(4',4'-dimethylsemicarbazido)-phenyl-N'-ethoxycarbonylthiourea,
N-2-(3'-p-toluenesulfonylureido)-phenyl-N'-methoxycarbonyl-thiourea,
N-2-(1'-methyl-3'-butylureido)-phenyl-N'-ethoxycarbonylthiourea,
N-2-(1'-ethyl-3'-butylureido)-phenyl-N'-isopropoxycarbonyl-thiourea,
N-2-(1'-methyl-3'-dodecylureido)-phenyl-N'-methoxycarbonyl-thiourea,
N-2-[(3'-butylureido)-4-chloro-phenyl]-N'-isopropoxycarbonyl-thiourea, and
N-2-[3'-butylureido)-4-methyl-phenyl]-N'-ethoxycarbonyl-thiourea.

The ureidophenylthioureas used as starting substances can be manufactured by reacting 2-ureido-aniline derivatives with alkoxycarbonyl isothiocyanates in the presence of a diluent, at reaction temperatures preferably between about 0 and 40° C. as described in German patent application P 19 60 029.4.

The generally known alkylating agents used as starting substances are defined by the Formula III. As examples thereof there may be mentioned: methyl iodide, ethyl iodide, isopropyl iodide, cyclohexylbromide, dimethylsulfate, toluenesulfonic acid methyl ester, allyl bromide, n-butyl bromide, cyclohexyl bromide and benzylchloride.

Possible diluents in carrying out the process according to the invention include water or organic solvents, especially polar organic solvents, for example alcohol, acetone, dimethylsulfoxide, dimethylformamide or acetonitrile, either alone or mixed with water.

The bases to be used as auxiliary agents in the reaction according to the invention can include most of the customary bases. Preferably, however, alkali metal hydroxides, carbonates or bicarbonates, such as potassium hydroxide, sodium hydroxide, sodium bicarbonate or sodium carbonate, are used.

The reaction temperatures can be varied over a wide range. In general the reaction is carried out at about −10 to +40° C., preferably about 0 to 30° C.

In carrying out the process according to the invention, 1 mole of alkylating agent and 1 mole of base may for example be employed per mole of ureidophenylthiourea. The alkylating agent and the base can also be used in excess without disadvantage. Working-up may be carried out by pouring into water, filtering off and recrystallizing the resulting product in the usual manner.

The active compounds according to the invention display a strong fungitoxic action. In the concentrations required for combating fungi, they do not generally damage crop plants, and they have a low toxicity to warm-blooded animals. For these reasons they are suitable for use as plant protection agents for combating fungi. Fungitoxic agents in plant protection are employed for combating Archimycetes, Phycomycetes, Ascomycetes, Basidiomycetes and Fungi imperfecti.

The active compounds according to the invention have a very broad spectrum of activity and can be employed against parasitic fungi which attack parts of the plant which are above ground, or which attack plants through the soil, and against seed-borne causative organisms of diseases.

They are particularly active against fungi which cause powdery mildew diseases. This group of fungi mainly includes representatives of the family of the Erysiphaceae, the most important genera being Erysiphe, Uncinula (Oidium), Sphaerotheca and Podosphaera. The following may be mentioned individually as important fungi: *Ery-* siphe cichoracearum, Podosphaera leucotricha, Uncinula necator and Sphaerotheca fuliginea.

The active compounds according to the invention furthermore prove of value in combating diseases of rice. Thus they display an excellent action against the fungi Piricularia oryzae and Pellicularia sasakii, as a result of which they can be employed for conjointly combating these two diseases. This represents an advance since hitherto agents of different chemical constitution were generally required for combating these two fungi. Surprisingly, the active compounds not only show a protective action, but also a curative and systemic effect.

The compounds according to the invention are also active against other fungi which attack rice plants or other crop plants, for example Cochliobolus miyabeanus, Mycosphaerella musicola, Cercospora personata, Botrytis cinerea, Alternaria species, Verticillium aboatrum, Phialophora cinerescens and Fusarium species, and also against the bacterium Xanthomonas oryzae.

The active compounds according to the invention also show an insecticidal and acaricidal action, and an action against certain moulds and yeasts. At higher concentrations than those which are fungicidally necessary, the compounds inhibit plant growth.

The active compounds according to the instant invention can be utilized, if desired, in the form of the usual formulations or compositions with conventional plant compatible or herbicidally inert pesticide diluents or extenders, i.e. diluents or extenders of the type usable in conventional pesticidal formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.) paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk (i.e. calcium carbonate, talc, kieselguhr, etc.), and ground synthetic minerals (e.g. highly dispersed silicic acid, silicates e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixture with one another and/or with such solid and/or liquid dispersible carrier vehicles and/or with other known compatible active agents, especially plant protection agents, such as other fungicides, herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.0001–95%, and preferably 2–90%, by weight of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.0001–95%, and preferably 0.01–95%, by weight of the mixture.

The active compound can also be used in accordance with the well known ultra-low-volume process with good success, i.e. by applying such compound if normally a liquid, or by applying a liquid composition containing the same, via very effective atomizing equipment in finely divided, e.g. average particle diameter of from 50–100 microns, or even less, form, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound, or even the 100% active substance alone, e.g. about 20–100% by weight of the active compound.

When used as a seed dressing, amounts of active compound of 0.1 to 10 g. per kg. of seed, preferably 0.2 to 2 g., are generally used.

When used as soil treatment agents, amounts of 1 to 500 g. of active substance per cubic meter of soil, preferably 10 to 200 g., are to be used.

In particular, the present invention contemplates methods of selectively killing, combating or controlling fungi, insects, acarids, bacteria, and growth of vegetation which comprises applying to at least one of (a) such fungi (b) insects, (c) acarids, (d) bacteria, (e) vegetation and (f) their habitat, i.e. the locus to be protected or regulated, a fungicidally, insecticidally, acaricidally, bactericidally or growth regulatory effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The effectiveness of the new compounds of the present invention is illustrated, without limitation, by the following examples.

EXAMPLE 1

Podosphaera test (powdery mildew of apples)
[protective]

Solvent: 4.7 parts by weight acetone
Emulsifier: 0.3 part by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table 1.

TABLE 1.—PODOSPHAERA TEST/PROTECTIVE

| Active compound | Infection in percent of the infection of the untreated control, at an active compound concentration (in percent) of— | |
|---|---|---|
| | 0.0062 | 0.00156 |
| (A) CH₃—NH—C(=S)—S\\Zn/S—C(=S)—NH—CH₂ (known) | 100 | 100 |
| (1) Phenyl[—N=C(SCH₃)—NH—COOC₂H₅][—NH—CO—NH—CH₃] | 35 | 38 |
| (2) Phenyl[—N=C(S—CH(CH₃)₂)—NH—COOC₂H₅][—NH—CO—NH—CH₂—CH₂—OCH₃] | 4 | 23 |
| (3) Phenyl[—N=C(S—CH₂—CH=CH₂)—NH—COOC₂H₅][—NH—CO—NH—CO₂—CH₂—OCH₃] | 20 | 60 |
| (4) Phenyl[—N=C(S—CH₂—CH=CH₂)—NH—COOC₂H₅][—NH—CO—NH—CH₃] | 44 | 61 |
| (5) Phenyl[—N=C(S—CH(CH₃)₂)—NH—COOC₂H₅][—NH—CO—NH—CH₃] | 5 | 19 |

EXAMPLE 2

Fusicladium test (systemic)

Solvent: 4.7 parts by weight acetone
Emulsifier: 0.3 part by weight alkylaryl polyglycol ether
Water: 95 parts by weight The amount of the active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc. of the liquid to be used for watering, in the stated concentration of active compound, with reference to 100 cc. of soil. The plants so treated are, after the treatment, inoculated with an aqueous conidium suspension of *Fusicladium dendriticum* Fuckel and incubated for 18 hours in a humidity chamber at 18–20° C. and at a relative atmospheric humidity of 100%. The plants are subsequently placed in a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from the following Table 2.

TABLE 2.—FUSICLADIUM TEST/SYSTEMIC

| Active compound | Infection [1] |
|---|---|
| (A) CH₂—NH—C(=S)—S\\Zn/S—C(=S)—NH—CH₂ (known) | 100 |
| (1) Phenyl[—N=C(SCH₃)—NH—COOC₂H₅][—NH—CO—NH—CH₃] | 40 |
| (2) Phenyl[—N=C(S—CH(CH₃)₂)—NH—COOC₂H₅][—NH—CO—NH—CH₂—CH₂—OCH₃] | 58 |
| (3) Phenyl[—N=C(S—CH₂—CH=CH₂)—NH—COOC₂H₅][—NH—CO—NH—CH₂—CH₂—OCH₃] | 42 |
| (4) Phenyl[—N=C(S—CH₂—CH=CH₂)—NH—COOC₂H₅][—NH—CO—NH—CH₃] | 60 |

TABLE 2—Continued

| Active compound | Infection [1] |
|---|---|
| (5) 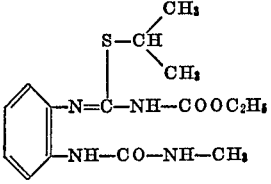 | 64 |

[1] In percent of the infection of the untreated control, at an active compound concentration of 30 p.p.m.

EXAMPLE 3

Fusicladium test (apple scab) (curative)

Solvent: 4.7 parts by weight acetone
Emulsifier: 0.3 part by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are inoculated with an aqueous conidium suspension of the apple scab causative organism (*Fusicladium dendriticum* Fuckel) and incubated for 18 hours in a humidity chamber at 18–20° C. and at an atmospheric humidity of 100%. The plants are then placed in a greenhouse where they dry.

After standing for a suitable period of time, the plants are sprayed dripping wet with the spray liquid prepared in the manner described above. The plants are again placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The active compounds, the concentrations of the active compounds, the period of time between inoculation and spraying and the results obtained can be seen from the following Table 3.

TABLE 3.—FUSICLADIUM TEST/CURATIVE

| Active compound | Dwell time in hours | Infection [1] |
|---|---|---|
| (A) CH₂—NH—C(=S)—S\ /Zn CH₂—NH—C(=S)—S/ (known) | 42 | 100 |
| (1) [phenyl]—N=C(SCH₃)—NH—COOC₂H₅, —NH—CO—NH—CH₃ | 42 | 20 |

TABLE 3—Continued

| Active compound | Dwell time in hours | Infection [1] |
|---|---|---|
| (2) [phenyl]—S—CH(CH₃)₂, —N=C—NH—COOC₂H₅, —NH—CO—NH—CH₂—CH₂—OCH₃ | 42 | 40 |
| (3) [phenyl]—S—CH₂—CH=CH₂, —N=C—NH—COOC₂H₅, —NH—CO—NH—CH₂—CH₂—OCH₃ | 42 | 20 |
| (4) [phenyl]—S—CH₂—CH=CH₂, —N=C—NH—COOC₂H₅, —NH—CO—NH—CH₃ | 42 | 26 |
| (5) [phenyl]—S—CH(CH₃)₂, —N=C—NH—COOC₂H₅, —NH—CO—NH—CH₃ | 42 | 20 |

[1] In percent of the infection of the untreated control, at an active compound concentration of 0.025%.

EXAMPLE 4

Piricularia and pellicularia test

Solvent: 4 parts by weight acetone
Dispersing agent: 0.05 part by weight sodium oleate
Water: 95.75 parts by weight
Other additives: 0.2 part by weight gelatin The amount of active compound required for the desired concentration of active compound in the spray liquor is mixed with the stated amount of solvent, and the concentrate is diluted with the stated amount of water containing the stated additives.

2 batches each consisting of 30 rice plants about 2–4 weeks old are sprayed with the spray liquor until dripping wet. The plants remain in a greenhouse at temperatures of 22 to 24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative humidity. The other batch of the plants is infected with a culture of *Pellicularia sasakii* grown on malt agar and placed at 28–30° C. and 100% relative atmospheric humidity.

5 to 8 days after inoculation, the infection of all the leaves present at the time of inoculation with *Piricularia oryzae* is determined as a percentage of the untreated but also inoculated control plants. In the cas of the plants infected with *Pellicularia sasakii*, the infection on the leaf sheaths after the same time is also determined in proportion to the untreated but infected control. 0% means no infection; 100% means that the infection is exactly as great as in the case of the control plants.

The active compounds, the concentrations of the active compounds and the results obtained can be seen from the following Table 4.

TABLE 4.—PROTECTIVE PIRICULARIA AND PELLICULARIA TEST

| | Piricularia | | Pellicularia | |
|---|---|---|---|---|
| Active compound | 0.05 | 0.025 | 0.05 | 0.025 |
| (A) Zn dimethyldithiocarbamate structure (known) | 25 | 100 | 25 | 50 |
| (1) phenyl-N=C(SCH₃)-NH-COOC₂H₅ with -NH-CO-NH-CH₃ | 0 | 0 | 0 | 17 |
| (2) phenyl-N=C(S-CH(CH₃)₂)-NH-COOC₂H₅ with -NH-CO-NH-CH₂-CH₂-OCH₃ | 0 | 0 | 0 | 0 |
| (3) phenyl-N=C(S-CH₂-CH=CH₂)-NH-COOC₂H₅ with -NH-CO-NH-CH₂-CH₂-OCH₃ | 17 | 50 | — | — |
| (4) phenyl-N=C(S-CH(CH₃)₂)-NH-COOC₂H₅ with -NH-CO-NH-CH₃ | 0 | 75 | 0 | 25 |

Column heading: Infection in percent of the infestation of the untreated control — Concentration, percent

EXAMPLE 5

Agar plate test

Test for fungitoxic effectiveness and breadth of the activity spectrum.

Solvent: Acetone
Parts by weight: (a) 1000; (b) 100.

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into petri dishes under sterile conditions. When the mixture of substrate and active compound has solidified, test fungi from pure cultures are inoculated onto it in small discs of 5 mm. diameter. The petri dishes remain at 20° C. for 3 days for incubation.

After this time, the inhibiting action of the active compound on the mycelium growth is determined in categories, taking into account the untreated control. O means no mycelium growth, either on the treated substrate or on the inoculum; the symbol — means mycelium growth on the inoculum only, no spread to the treated substrate; and the symbol + means mycelium growth from the inoculum onto the treated substrate, similar to the spread to the untreated substrate of the conrol.

The active compounds, the concentration of the active compounds, the test fungi and the inhibition effects achieved can be seen from the following Table 5:

TABLE 5.—AGAR PLATE TEST

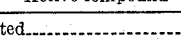

TABLE 5—Continued

| Active compound | Active compound concentration[1] in the substrate, in p.p.m. | Corticium rolfsii | Sclerotinia sclerotiorum | Verticillium alboatrum | Thielaviopsis basicola | Phytophthora cyctorum | Fusarium culmorum | Fusarium oxysporum | Fusarium solani f. pisi |
|---|---|---|---|---|---|---|---|---|---|
| (1) ![structure: benzene ring with SCH3, N=C-NH-COOC2H5, NH-CO-NH-CH3] | (a) 10 (b) 100 | + 0 | − 0 | + + | − 0 | + − | + 0 | − 0 | + + |
| (3) ![structure: benzene with S-CH2-CH=CH2, N=C-NH-COOC2H5, NH-CO-NH-CH2-CH2-OCH3] | (a) 10 (b) 100 | + + | 0 0 | + 0 | − 0 | + + | − 0 | 0 0 | + + |
| (4) ![structure: benzene with S-CH2-CH=CH2, N=C-NH-COOC2H5, NH-CO-NH-CH3] | (a) 10 (b) 100 | + 0 | 0 0 | + − | − 0 | + 0 | + 0 | + 0 | + 0 |
| (5) ![structure: benzene with S-CH(CH3)2, N=C-NH-COOC2H5, NH-CO-NH-CH3] | (a) 10 (b) 100 | + + | 0 0 | − 0 | 0 0 | + + | 0 0 | 0 0 | + + |

EXAMPLE 6

Seed dressing test/bunt of wheat
(seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 6.

TABLE 6.—SEED DRESSING TEST/BUNT OF WHEAT

| Active compound | Active compound concentration in the dressing, in percent by weight | Amount of dressing used, in g./kg. of seed | Spore germination in percent |
|---|---|---|---|
| Without dressing | | | >10 |
| (A) ![structure: CH2-NH-C(=S)-S / CH2-NH-C(=S)-S \ Zn] (known) | 10 | 1 | 5 |
| (1) ![benzene with SCH3, N=C-NH-COOC2H5, NH-CO-NH-CH3] | 30 | 1 | 0.5 |
| (2) ![benzene with S-CH(CH3)2, N=C-NH-COOC2H5, NH-CO-NH-CH2-CH2-OCH3] | 10 30 | 1 1 | 0.005 0.000 |

TABLE 6—Continued

| Active compound | Active compound concentration in the dressing, in percent by weight | Amount of dressing used, in g./kg. of seed | Spore germination in percent |
|---|---|---|---|
| (3) [structure: S—CH₂—CH=CH₂ / N=C—NH—COOC₂H₅ / phenyl with NH—CO—NH—CH₂—CH₂—OCH₃] | 30 | 1 | 0.5 |
| (5) [structure: S—CH(CH₃)₂ / N=C—NH—COOC₂H₅ / phenyl with NH—CO—NH—CH₃] | 30 | 1 | 0.005 |

The preparation of representative compound is shown in the following illustrative examples:

EXAMPLE 7

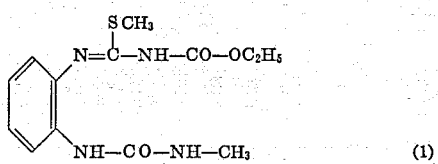

(1)

59.2 g. (0.2 mole) of N-2-(3'-methylureido)-phenyl-N'-ethoxycarbonyl-thiourea are suspended in 200 ml. of dimethylformamide, and 11.2 g. (0.2 mole) of potassium hydroxide in 50 ml. of water are added thereto, whereupon a clear solution of all the material is formed. After 28.4 g. (0.2 mole) of methyl iodide have been added thereto, the whole is left to stand for 3 hours at room temperature and is then poured into one liter of water. The product which precipitates is filtered off, washed with water and dried. 50 g. of N-2-(3'-methylureido)-phenyl-N'-ethoxycarbonyl - S - methyl-isothiourea are obtained; after recrystallization from ethanol, the compound melts at 150° C., with decomposition. The yield is 80% of theory.

EXAMPLE 8

The following compounds are obtained in a manner similar to that of Example 7.

| Formula | Melting point, °C. |
|---|---|
| (2) [S—C₃H₇-i / N=C—NH—CO—OC₂H₅ / phenyl—NH—CO—NH—CH₂—CH₂—OCH₃] | ¹145 |
| (3) [S—CH₂—CH=CH₂ / N=C—NH—CO—OC₂H₅ / phenyl—NH—CO—NH—CH₂—CH₂—OCH₃] | 116 |
| (4) [S—CH₂—CH=CH₂ / N=C—NH—CO—OC₂H₅ / phenyl—NH—CO—NH—CH₃] | 146 |
| (5) [S—C₃H₇-i / N=C—NH—CO—OC₂H₅ / phenyl—NH—CO—NH—CH₃] | ¹169 |

¹ With decomposition.

It will be appreciated that the instant specification and examples are set forth by way of illustration and not limitation, and that various modifications and changes may be made without departing from the spirit and scope of the present invention.

What is claimed is:

1. A ureidophenylisothiourea of the formula:

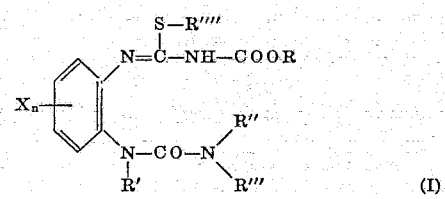

(I)

in which
$n$ is 0, 1 or 2,
X is halogen or lower alkyl,
R is lower alkyl,
R' and R'' are each hydrogen or lower alkyl,
R''' is hydrogen; alkyl with 1 to 18 carbon atoms optionally substituted by halogen or cycloalkyl with 5 to 8 carbon atoms; and
R'''' is alkyl with 1 to 12 carbon atoms or cycloalkyl with 3 to 8 carbon atoms.

2. A compound according to claim 1 in which X is chlorine, bromine, fluorine or lower alkyl; $n$ is 0 or 1; R is methyl or ethyl; R' and R'' are each hydrogen or methyl or ethyl; R''' is hydrogen or alkyl with up to 12 carbon atoms, and R'''' is alkyl of 1 to 4 carbon atoms or cyclohexyl.

3. A ureidophenylisothiourea according to claim 1 wherein such compound is N-2-(3'-methyl-ureido)-phenyl-N'-ethoxycarbonyl-S-methyl-isothiourea of the formula

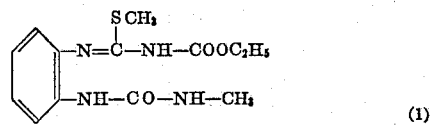

(1)

4. A ureidophenylisothiourea according to claim 1 wherein such compound is N-2-(3'-methyl-ureido)-phenyl-N'-ethoxycarbonyl-S-isopropyl-isothiourea of the formula
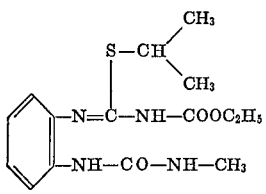
(5)
References Cited
FOREIGN PATENTS
| | | | |
|---|---|---|---|
| 4,519,078 | 3/1970 | Japan | 280—470 |
| 1,054,777 | 4/1959 | Germany | 280—470 |
| 1,191,406 | 5/1970 | Great Britain | 280—470 |
| 694,362 | 1/1970 | South Africa | 280—470 |
LORRAINE, A. WEINBERGER, Primary Examiner
J. F. TERAPANE, Assistant Examiner
U.S. Cl. X.R.
71—98; 260—465 D; 424—304, 309

FO-1050
(5/69)

UNITED STATES PATENT OFFICE
CERTIFICATE OF CORRECTION

Patent No. 3,766,243               Dated  October 16, 1973

Inventor(s)   Arno Widdig et al

It is certified that error appears in the above-identified patent and that said Letters Patent are hereby corrected as shown below:

Col. 3, line 11, correct spelling of "ureidophenylisothioureas"

Col. 10, line 67, correct spelling of "case".

Col. 11, Table 5, and Col. 13, under heading "Active compound concentration in the substrate, in p.p.m." delete "$^1$" after "tration".

Col. 13, line 44, after "dressing" insert --, the seed is shaken with the dressing --.

Col. 15, Example 8, under heading "Melting point °C", formulas 2 and 5, delete "$^1$" before "145" and "169".

Signed and sealed this 14th day of May 1974.

(SEAL)
Attest:

EDWARD M. FLETCHER, JR.
Attesting Officer

C. MARSHALL DANN
Commissioner of Patents